(12) United States Patent
DeCosmo et al.

(10) Patent No.: US 10,837,627 B1
(45) Date of Patent: Nov. 17, 2020

(54) CLIP FOR HOLDING A LIGHT BULB PARALLEL TO A LIGHT STRING

(71) Applicant: Ulta-Lit Tree Company, Glenview, IL (US)

(72) Inventors: John DeCosmo, Glenview, IL (US);
Gregory J. Foster, Chicago, IL (US);
Robert W. Sheldon, Winnetka, IL (US)

(73) Assignee: Ulta-Lit Tree Company, Glenview, IL (US)

( * ) Notice: Subject to any disclaimer, the term of this patent is extended or adjusted under 35 U.S.C. 154(b) by 0 days.

(21) Appl. No.: 16/449,043

(22) Filed: Jun. 21, 2019

(51) Int. Cl.
| | |
|---|---|
| F21V 21/008 | (2006.01) |
| F21V 21/088 | (2006.01) |
| F16B 2/22 | (2006.01) |
| F21V 23/00 | (2015.01) |
| F21W 121/04 | (2006.01) |
| F21S 4/10 | (2016.01) |

(52) U.S. Cl.
CPC .............. *F21V 21/008* (2013.01); *F16B 2/22* (2013.01); *F21V 21/088* (2013.01); *F21V 23/001* (2013.01); *F21S 4/10* (2016.01); *F21W 2121/04* (2013.01)

(58) Field of Classification Search
CPC .... F21V 21/008; F21V 23/088; F21V 23/001; F21V 17/16; F16G 11/02; F16B 2/22; F21W 2121/00; F21W 2121/04; F21S 4/10
See application file for complete search history.

(56) References Cited

U.S. PATENT DOCUMENTS

| | | | |
|---|---|---|---|
| 1,303,103 A | 5/1919 | Moseman | |
| 1,895,656 A | 1/1933 | Gadke | |
| 3,189,310 A | 6/1965 | Trueson | |
| 4,888,671 A | 12/1989 | Reimer | |
| 4,901,960 A | 2/1990 | Gary | |
| 5,110,078 A | 5/1992 | Gary | |
| 5,288,047 A | 2/1994 | Pan | |
| 5,481,444 A | 1/1996 | Schultz | |
| 5,581,956 A * | 12/1996 | Fennessy | F21V 21/088 248/237 |
| 5,584,567 A * | 12/1996 | Rumpel | A47G 33/105 248/229.16 |

(Continued)

OTHER PUBLICATIONS

Adams USA, Tie-It-Alls Brochure, http://www.adamsmfg.com/products/christmas-hardware-accessories/misc-holiday-accessories/tie-it-alls, accessed May 2020 (4 pages).

*Primary Examiner* — Peggy A Neils
(74) *Attorney, Agent, or Firm* — Nixon Peabody LLP (57) ABSTRACT

An inline clip for holding a light bulb along a light string includes a top flat area, two symmetrical sides, and two symmetrical tabs. The flat area has a constant width extending across a side profile and a constant thickness extending from a top surface of the top flat area to an internal surface of the top flat area. The two symmetrical sides extend in a continuous manner at respective upper ends from a left end and a right end of the top flat area, and are arcuate shaped for forming a hollow interior space configured to receive within the light bulb and a portion of the light string aligned side-by-side along a diameter of the light bulb. The two symmetrical tabs extend in a continuous manner at respective connecting ends from the lower ends of the two symmetrical sides.

14 Claims, 11 Drawing Sheets

(56) References Cited

U.S. PATENT DOCUMENTS

| | | | |
|---|---|---|---|
| 5,664,877 A * | 9/1997 | Wu | F21V 19/0005 |
| | | | 362/123 |
| 5,915,848 A | 6/1999 | Deason | |
| 6,056,418 A * | 5/2000 | Hsu | F21V 19/0005 |
| | | | 362/249.08 |
| 6,179,647 B1 | 1/2001 | Kinderman | |
| 6,315,430 B1 | 11/2001 | Huang | |
| 6,488,391 B1 | 12/2002 | Gary | |
| 10,323,830 B2 * | 6/2019 | Adams, IV | F21V 17/16 |

* cited by examiner

CLIP FOR HOLDING A LIGHT BULB PARALLEL TO A LIGHT STRING

FIELD OF THE INVENTION

The present invention relates generally to a holder for a light bulb, and, more particularly, to a device and method for orienting a light bulb along a light string.

BACKGROUND OF THE INVENTION

One of the most common uses of light strings is for decoration and display purposes, particularly during Christmas and other holidays. Such light strings are particularly popular for the decoration of the residential, commercial, and industrial buildings, trees, shrubbery, and the like. One problem associated with decorations using the light strings is that light bulbs tend to naturally orient in various, different positions relative to each other or relative to the light string itself. This typically creates aesthetically unpleasant results, along with aggravation and frustration for some decorators. In addition to the aesthetic problem, the generally uncontrolled positioning of each light bulb might also create space-allocation problems, with some light bulbs resulting, for example, in an orientation that impedes with the decorated object or that prevents the light emitted by the light bulb to be seen as intended. Thus, in many decoration instances, frustration and time-consuming efforts greatly interfere with the decoration of light bulbs along light strings based on a lack of a proper orientation device for the light bulbs.

Thus, there is a need for providing a holding device and method that prevents or reduces the above and other problems.

SUMMARY OF THE INVENTION

According to one embodiment of the present disclosure, an inline clip for holding a light bulb along a light string includes a top flat area defined by a straight length extending across a front profile, a constant width extending across a side profile, and a constant thickness extending from a top surface of the top flat area to an internal surface of the top flat area. The top flat area has a left end and a right end. The inline clip further includes two symmetrical sides extending in a continuous manner at respective upper ends from the left end and the right end of the top flat area, each of the two symmetrical sides being defined in part by the same constant thickness of the top flat area. The two symmetrical sides are arcuate shaped and form a hollow interior space configured to receive within a light bulb and a portion of the light string aligned side-by-side along their respective diameters. According to some embodiments, the hollow interior space is oval-shaped or circular-shaped. Each of the two symmetrical sides has a lower end that is closer to a center point of the interior space than a respective upper end. The inline clip also includes two symmetrical tabs extending in a continuous manner at respective connecting ends from the lower ends of the two symmetrical sides, the two symmetrical tabs extending in a straight line from the respective lower ends to terminating ends. The terminating ends are farther from the center point of the interior space than the lower ends of the two symmetrical sides but closer to the center point of the interior space than outermost portions of the two symmetrical sides.

According to another embodiment of the present disclosure, a method is directed to holding light bulbs inline along a light string and includes providing plurality of inline holders including a first inline holder and a second inline holder. The first inline holder has a first interior space and the second inline holder has a second interior space. The method further includes providing a light string having a plurality of light bulbs extending from a common electrical wire, the plurality of light bulbs including a first light bulb near a first adjacent wire portion of the common electrical wire. The plurality of light bulbs further includes a second light bulb near a second adjacent wire portion of the common electrical wire. The method also includes inserting the first light bulb within the first interior space of the first inline holder such that the first light bulb is inline with the first adjacent wire portion, and inserting the second light bulb within the second interior space of the second inline holder such that the second light bulb is inline with the second adjacent wire portion.

According to yet another embodiment of the present disclosure, an inline clip for holding a light bulb inline with a light string includes a flat area having a rectangular shape defined by a length and a width, a left end of the flat area being separated from a right end of the flat area by the length, and a front end of the flat area being separated from a back end of the flat area by the width. The inline clip further includes a C-shaped left side having a left top end continuously joined with the left end of the flat area, the C-shaped left side having a left bottom end that is closer to a center point of the length than the left top end. The left bottom end is located away from the flat area at a left height, the left height being perpendicular to the length and width. The inline clip also includes a C-shaped right side having a right top end continuously joined with the right end of the flat area, the C-shaped right side having a right bottom end that is closer to a center point of the length than the right top end. The right bottom end is located away from the flat area at a right height, the right height being perpendicular to the length and the width. The left bottom end and the right bottom end are separated from each other by a bottom gap, the C-shaped left side and the C-shaped right side forming a hollow space for receiving a light bulb of a light string. The inline clip also further includes a left tab continuously joined at a left starting end to the left bottom end and extending to a left terminating end, the left starting end being closer to the center point of the length than the left terminating end. The inline clip also includes a right tab continuously joined at a right starting end to the right bottom end and extending to a right terminating end, the right starting end being closer to the center point of the length than the left terminating end.

Additional aspects of the disclosure will be apparent to those of ordinary skill in the art in view of the detailed description of various embodiments, which is made with reference to the drawings, a brief description of which is provided below.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Referring generally to FIGS. 1-6, an inline holder is configured with a shape and size for holding a light bulb of a light string oriented in a desired orientation. According to one embodiment, the inline holder is in the form of an inline clip 100 that has a top flat area 102 defined by a straight length L1, which extends across a front profile of the inline clip 100. The top flat area 102 is further defined by a constant width W1 that extends across a side profile of the inline clip 100, and by a constant thickness T1 extending from a top (or exterior) surface 104 of the top flat area 102 to a bottom (or interior) surface 106 of the top flat area 102. The top flat area 102 further has a left end 108 and a right end 110.

The inline clip 100 further has two sides, including a left side 112 and a right side 114. Each of the left and right sides 112, 114 extends in a continuous manner at respective upper (or top) ends 116, 118 from the left end 108 and the right end 110 of the top flat area 102. Specifically, the left side 112 has a left upper end 116 that extends from and is continuously joined with the left end 108 of the top flat area 102, and the right side 114 has a right upper end 118 that extends from and is continuously joined with the right end 110 of the top flat area 102. According to one optional feature, the two sides 112, 114 are symmetrical along a height symmetry line HS. According to another optional feature, the left and right sides 112, 114 are C-shaped.

Each of the left and right sides 112, 114 is defined in part by a constant thickness T2, T3. According to one embodiment, the constant thickness T2 of the left side 112 is equal to at least one of the constant thickness T3 of the right side 112 and the constant thickness T1 of the top flat area.

Each of the left and right sides 112, 114 is arcuate shaped, forming a hollow interior space 117 configured to receive within a light bulb 119 and an adjacent wire portion 120 of a light string 122 (described in more detail below and illustrated in FIGS. 7-11), which are aligned side-by-side along their respective diameters. According to an optional feature, the interior space 117 is oval-shaped or circular-shaped.

Each of the left and right sides 112, 114 further has a lower (or bottom) end 124, 126 that is closer to a center point X of the interior space 117 than a respective upper end 116, 118. A left lower end 124 is separated from a right lower end 126 by a bottom gap L2, which provides entry access to the interior space 117 for the light bulb 119 and the adjacent wire portion 120.

The inline clip 100 also has two tabs 128, 130 that extend in a continuous manner at respective connecting ends 132, 134 from the lower ends 124, 126. The two tabs, 128, 130, which include a left tab 128 and a right tab 130, extend in a straight line from the respective lower ends 124, 126 to respective terminating ends 133, 135. The terminating ends 133, 135, which include a left terminating end 133 and a right terminating end 135, are located (along the length of the inline clip 100) farther from the center point X of the interior space 117 than the lower ends 124, 126, but closer to the center point X than outermost portions 136, 138 of the left and right sides 112, 114. According to an optional feature, the two tabs 128, 130 are symmetrical along the height symmetry line HS.

Each tab 128, 130 optionally includes a respective front chamfered edge 140, 142 between a respective front surface 144, 146 and a respective bottom surface 148, 150. The tabs 144, 146 further optionally include a respective rear chamfered edge 152, 154 between a respective rear surface 156, 158 and the respective bottom surface 148, 150.

In accordance with one exemplary feature, the straight length L1 of the top flat area 102 is approximately 0.32 inches. As referred here, the term "approximately" provides a variance of plus or minus 10% of the value. Thus, according to this exemplary feature, the straight length L1 is in the range of 0.29-0.35 inches.

In accordance with another exemplary feature, the constant width W1 of the top flat area 102 is approximately 0.49 inches. Thus, according to this exemplary feature, the constant thickness W1 is in the range of 0.44-0.54 inches.

In accordance with another exemplary feature, the constant thickness T1 of the top flat area 102 is approximately 0.01 inches. Thus, according to this exemplary feature, the constant thickness T1 is in the range of 0.009-0.011 inches.

In accordance with another exemplary feature, an outermost distance L3 between the outermost portions 136, 138 is approximately 0.59 inches. Thus, according to this exemplary feature, the outermost distance L3 is in the range of 0.53-0.65 inches.

In accordance with another exemplary feature, each of the left and right lower ends 124, 126 (as measured from each respective exterior surface) is separated from respective left and right upper ends 116, 118 (as measured from each respective exterior surface) by a distance H1 that is approximately 0.35 inches. Thus, according to this exemplary feature, the distance H1 is in the range of 0.32-0.39 inches.

In accordance with another exemplary feature, the connecting ends 132, 134 are separated internally by the gap L2, which is approximately 0.16 inches. Thus, according to this exemplary feature, the gap L2 is in the range of 0.14-0.18 inches.

In accordance with another exemplary feature, the terminating ends 133, 135 are separated internally by a distance L4, which is approximately 0.23 inches. Thus, according to this exemplary feature, the distance L4 is in the range of 0.21-0.25 inches.

In accordance with another exemplary feature, the top surface 104 of the top flat area 102 is separated from the terminating ends 133, 135 by a total height distance H2 of approximately 0.513 inches. Thus, according to this exemplary feature, the total height distance H2 is in the range of 0.46-0.56 inches.

The above disclosed exemplary features are intended to configure the inline clip 100 either individually and/or in combination with one another. Thus, according to an exemplary configuration, the inline clip 100 has a total length TL (which is the same as the outermost distance L3), a total width TW (which is the same as the constant width W1), and a total height TH (which is the same as the total height distance H2) that provide specific desired ratios. For example, the inline clip 100 is configured to have a ratio TL/TW of the total length TL to the total width TW of approximately 1.0-1.2, a ratio of TL/TH of the total length TL to the total height TH of approximately 0.9-1.1, and a ratio of TH/TW of the total height TH to the total width TW of approximately 0.9-1.1.

Figure 1:
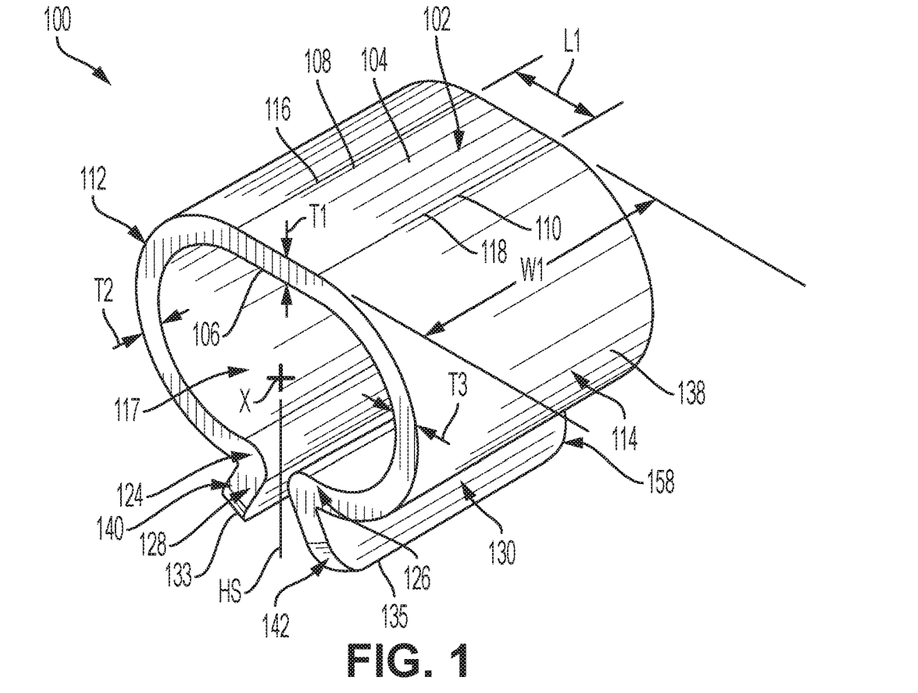
FIG. 1 is a top perspective view of an inline clip.
Figure 2:
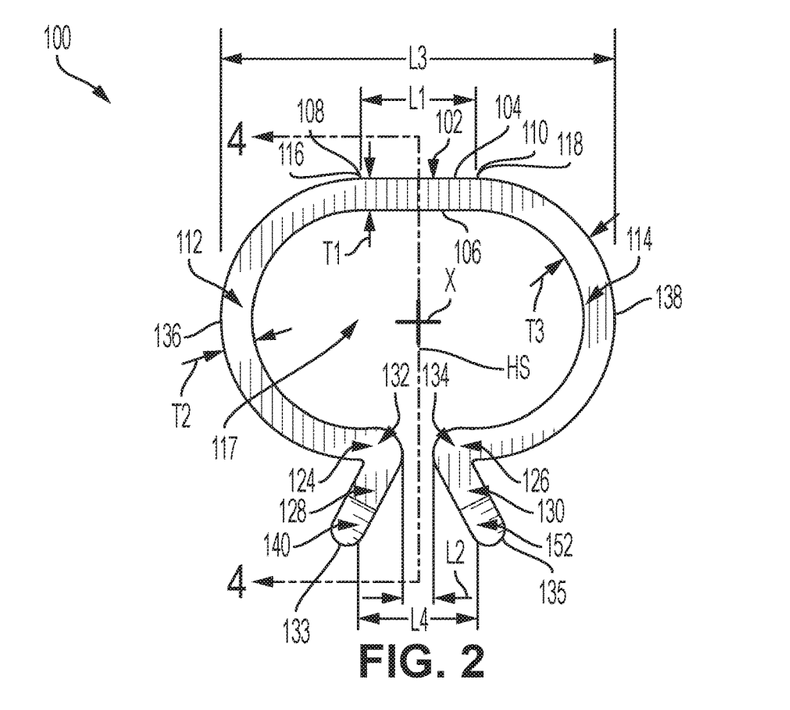
FIG. 2 is a front view of the inline clip of FIG. 1.
Figure 3:
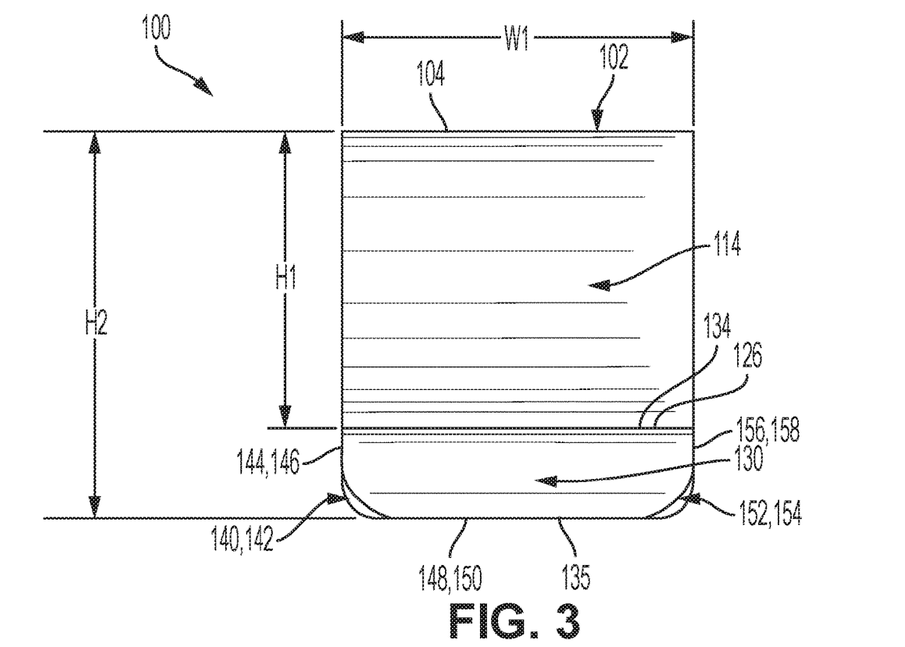
FIG. 3 is a right side view of the inline clip of FIG. 1.
Figure 4:
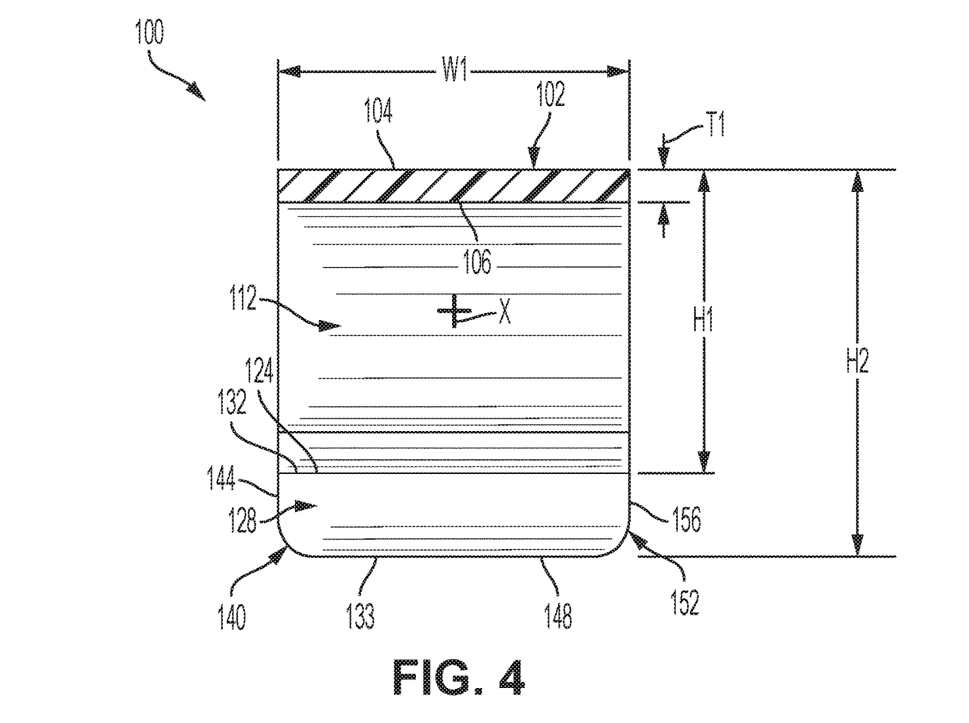
FIG. 4 is a right cross-sectional view of the inline clip along lines "4-4" in FIG. 1.
Figure 5:
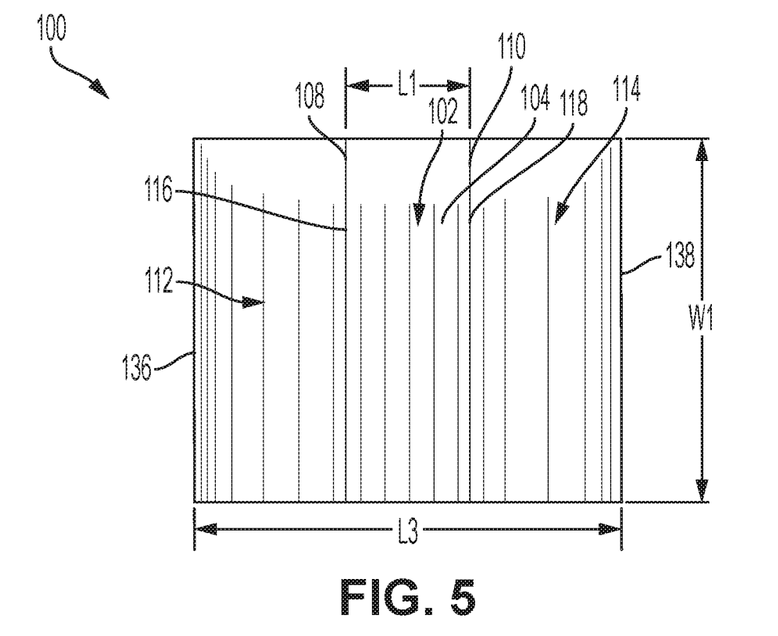
FIG. 5 is a top view of the inline clip of FIG. 1.
Figure 6:
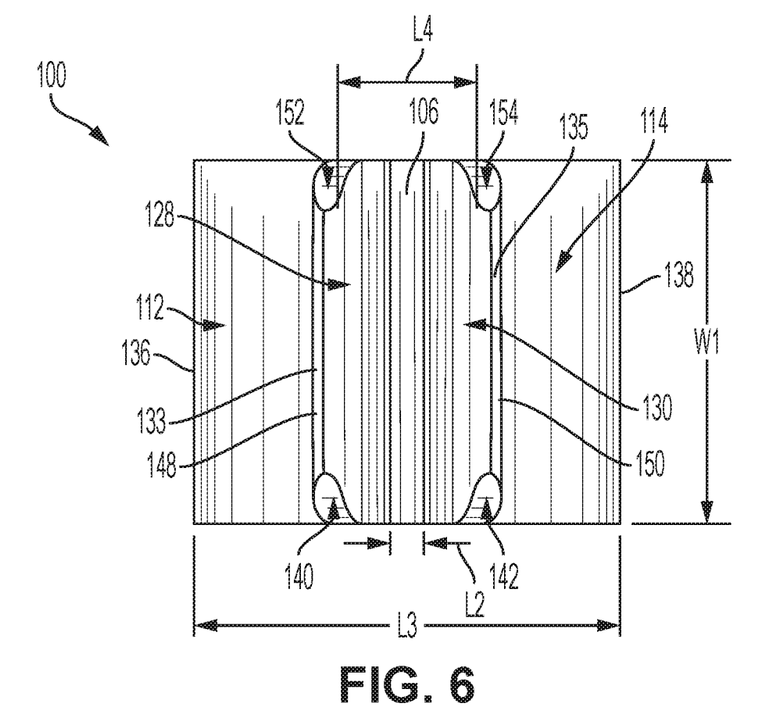
FIG. 6 is a bottom view of the inline clip of FIG. 1.
Figure 7:
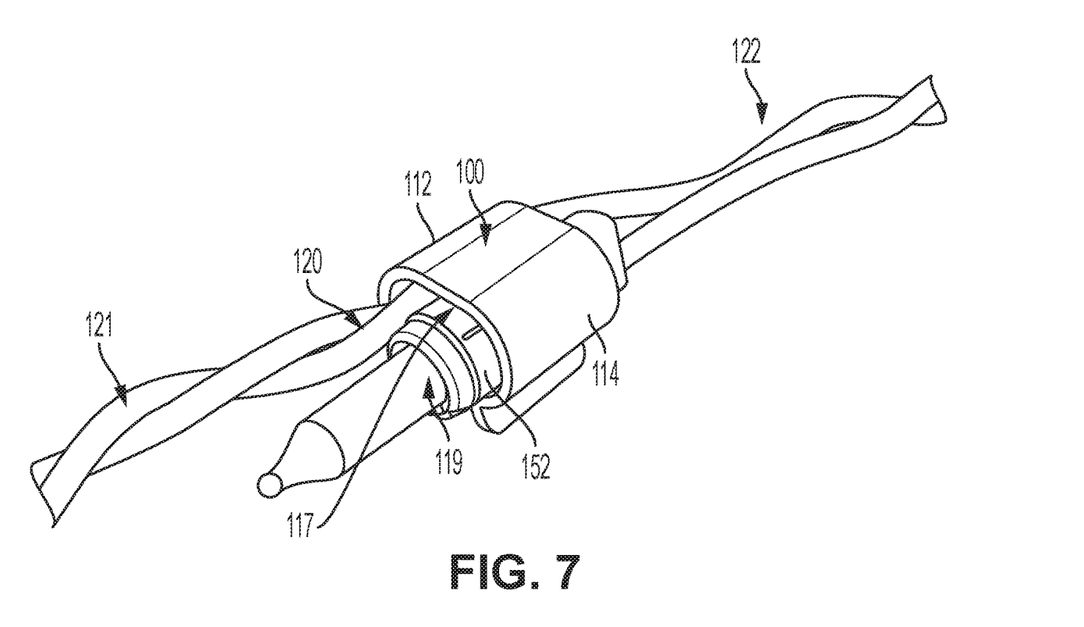
FIG. 7 is a top perspective view of an assembly illustrating the inline clip of FIG. 1 with an inserted light bulb and adjacent wire portion.
Figure 8:
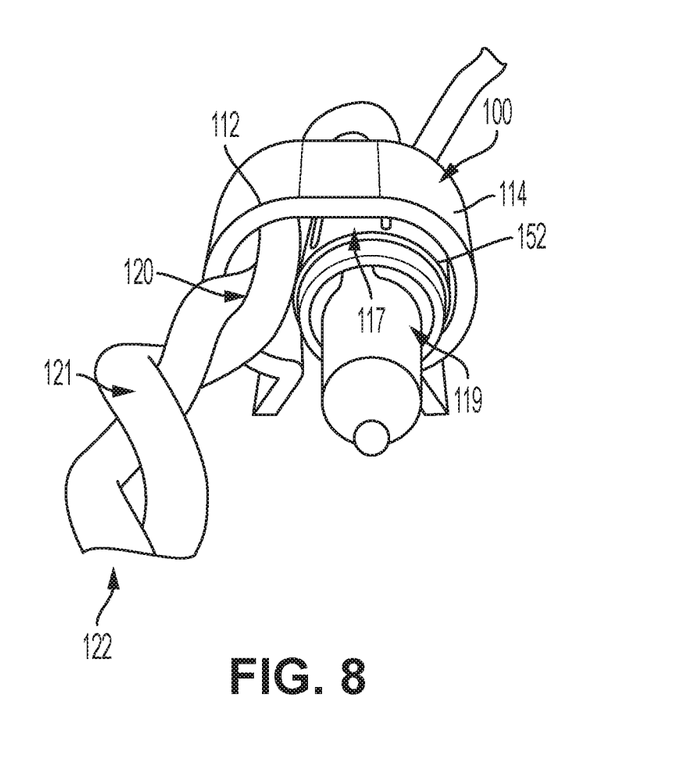
FIG. 8 is a front perspective view of assembly of FIG. 7.
Figure 9:
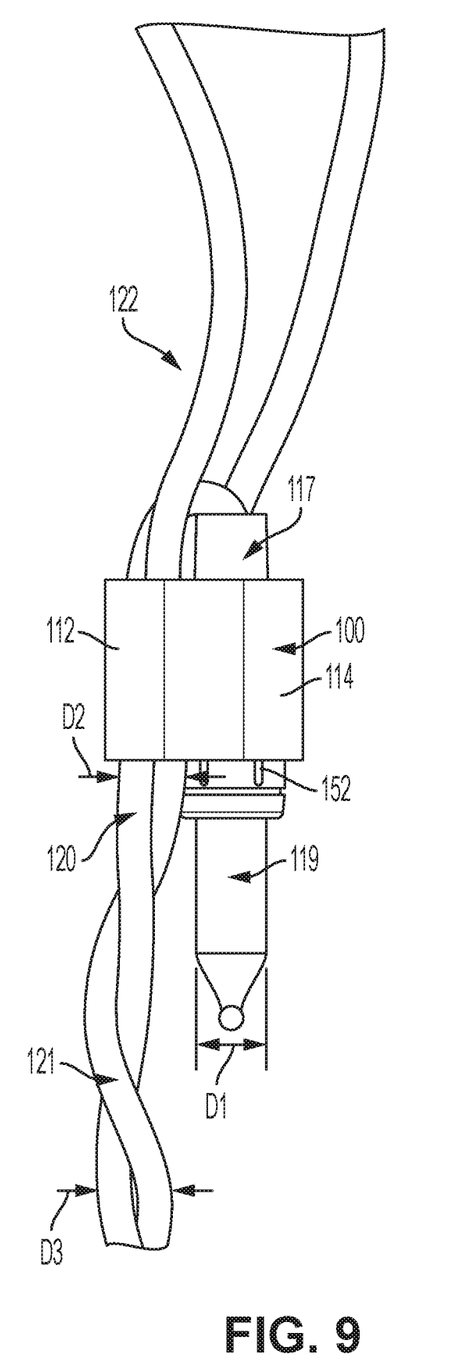
FIG. 9 is a top view of the assembly of FIG. 7.

Referring generally to FIGS. 7-9, the inline clip 100 is assembled to the light bulb 119 and to the adjacent wire portion 120 of the light string 122. The adjacent wire portion 120 is one portion of a common electrical wire 121 of the light string 122 that electrically connects the light bulb 119 to other ones of a plurality of light bulbs of the light string 122. The light bulb 119 is located within the interior space 117, with a bulb base 152 in contact with an interior surface of the inline clip 100 near the right side 114. The adjacent wire portion 120 is also located within the interior space 117 in contact with the interior surface of the inline clip 100 near the left side 112.

Referring specifically to FIG. 9, the bulb base 152 and the adjacent wire portion 120 are in contact with each, pressed snuggly against each other and against the respective left and right sides 112, 114 of the inline clip 100. As such, the light bulb 119 and the adjacent wire portion 120 are fixed in place relative to the inline clip 100 with diameter D1 of the light bulb 119 and diameter D2 of the adjacent wire portion 120 aligned parallel to or in line with diameter D3 of the common electrical wire 121.

Figure 10:
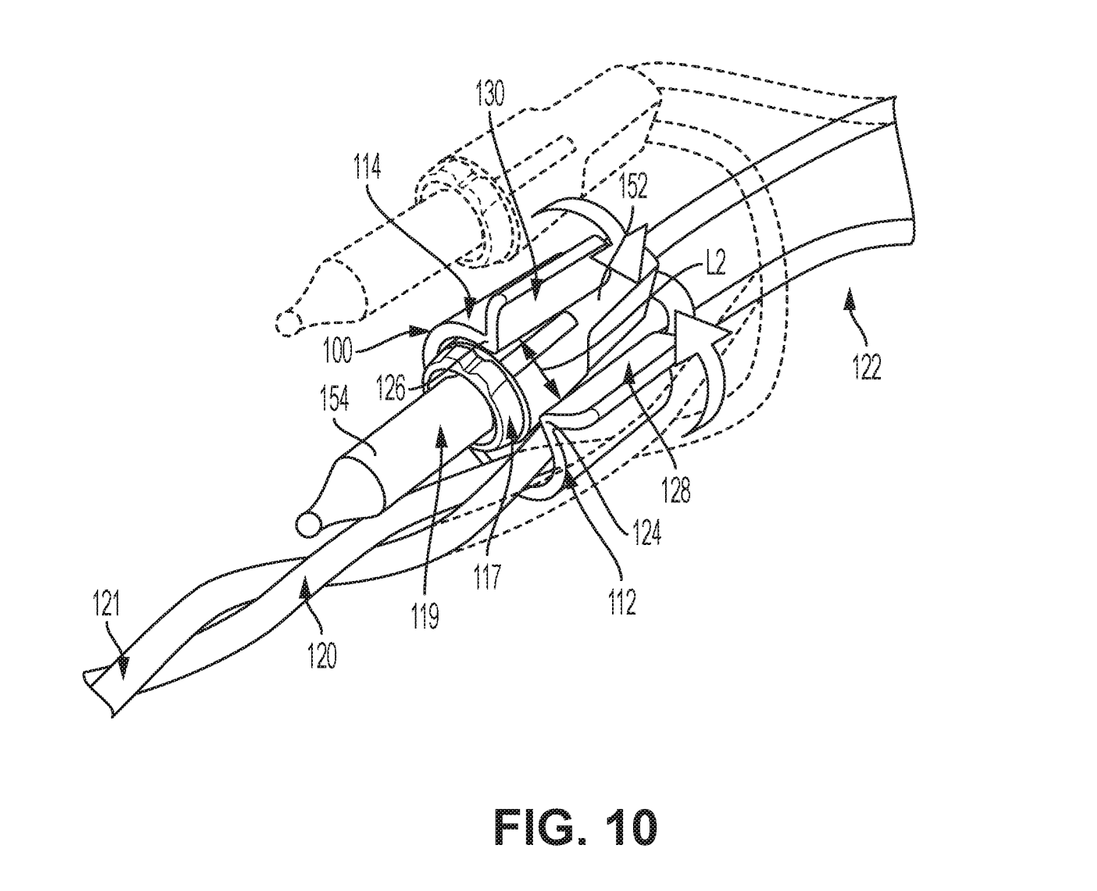
FIG. 10 is a perspective view illustrating a method for assembling the assembly of FIG. 7.

Referring to FIG. 10, one exemplary method of assembling the light bulb 119 and the adjacent wire portion 120 within the inline clip 100 is achieved by inserting the light bulb 119 and the adjacent wire portion 120 through the bottom gap L2 of the inline clip 100. As illustrated via dashed lines, the light bulb 119 is inserted within the interior space 117 by sliding the bulb base 152 or a bulb light 154 along and between the tabs 128, 130. The diameter D1 of the light bulb 119 is larger than the bottom gap L2, and, accordingly, the sides 112, 114 are flexible to temporarily move away from each other near the lower ends 124, 126 for allowing a pressed-fit insertion of the bulb base 152 within the interior space 117. Accordingly, the bottom gap L2 temporarily increases as the light bulb 119 is inserted within the inline clip 100. After the light bulb 119 is inserted through the bottom gap L2, the lower ends 124, 126 return to their original position in which they are separated by the bottom gap L2. To provide flexibility of the sides 112, 114, the inline clip 100 consists of a flexible material, such as, for example, a plastic material.

Similarly, the adjacent wire portion 120 is inserted through the bottom gap L2 and arranged snuggly between the bulb base 152 and the interior surface of the inline clip 100. The diameter D2 of the adjacent wire portion 120 is smaller than the bottom gap L2, and, thus, it does not cause a temporary increase in the bottom gap L2 as the adjacent wire portion 120 is being inserted within the inline clip 100. Upon insertion, if the bulb base 152 is positioned near the right side 114, the adjacent wire portion 120 is positioned near the left side 114 (or vice-versa).

As already mentioned, the bottom gap L2 is configured such that it is smaller than diameter D1 of the light bulb 119 but larger than diameter D2 of the adjacent wire portion 120. This relative size is beneficial for maintaining a snug-fit of the light bulb 119 and the adjacent wire portion 120 within the inline clip 100.

According to alternative assembly methods, the light bulb 119 and/or the adjacent wire portion 120 are inserted inline directly through the interior space 117. In other words, instead of inserting either the light bulb 119 or the adjacent wire portion 120 through the bottom gap L2, at least one of the light bulb 119 and the adjacent wire portion 120 is inserted inline with the common electrical wire 121 directly through the interior space 117.

Figure 11:
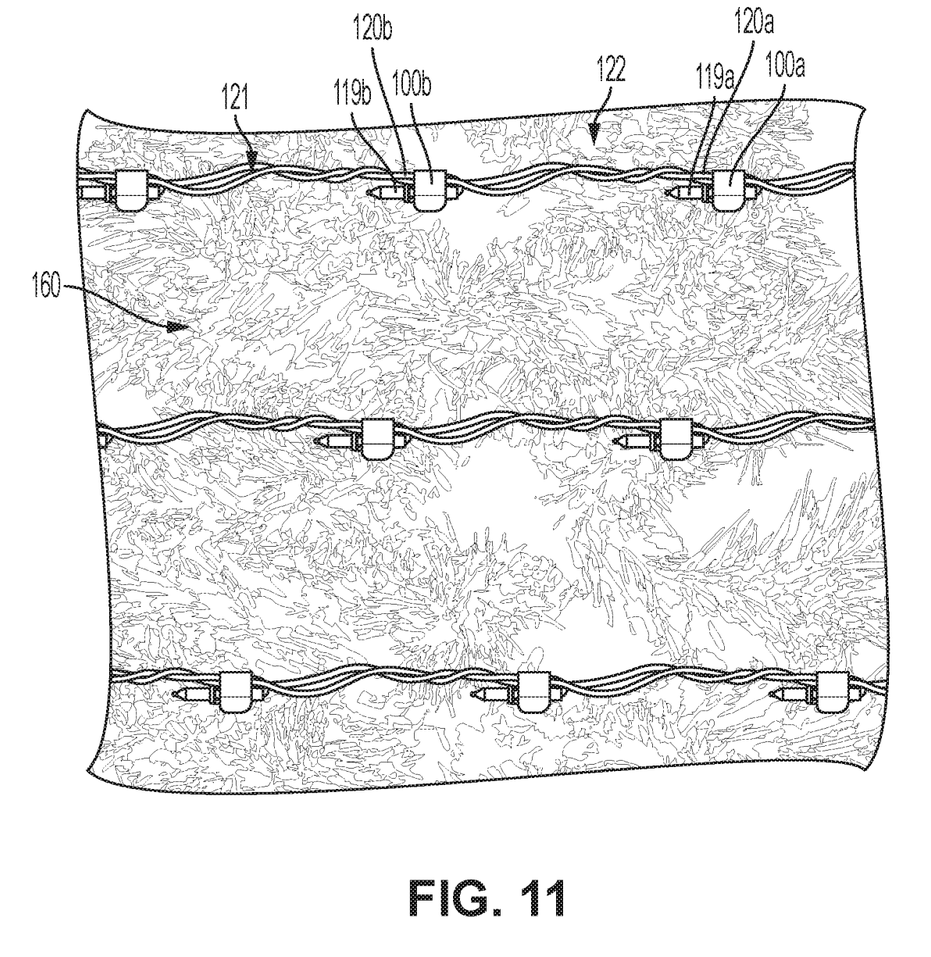
FIG. 11 is a side view illustrating a plurality of assembled inline clips with respective light bulbs decorated on a Christmas tree.

Referring to FIG. 11, the light string 122 decorates a Christmas tree 160 in which a plurality of light bulbs includes a first light bulb 119a and a second light bulb 119b. Each of the first and second light bulbs 119a, 119b is oriented inline with the common electrical wire 121 within respective inline clips 100a, 100b. Adjacent wire portions 120a, 120b, of the common electrical wire 121 are also inserted within respective ones of the inline clips 100a, 100b. Thus, in this illustrated embodiment, at least two (if not all) of the light bulbs are oriented in the same direction, e.g., inline with the common electrical wire 121.

Figure 12A:
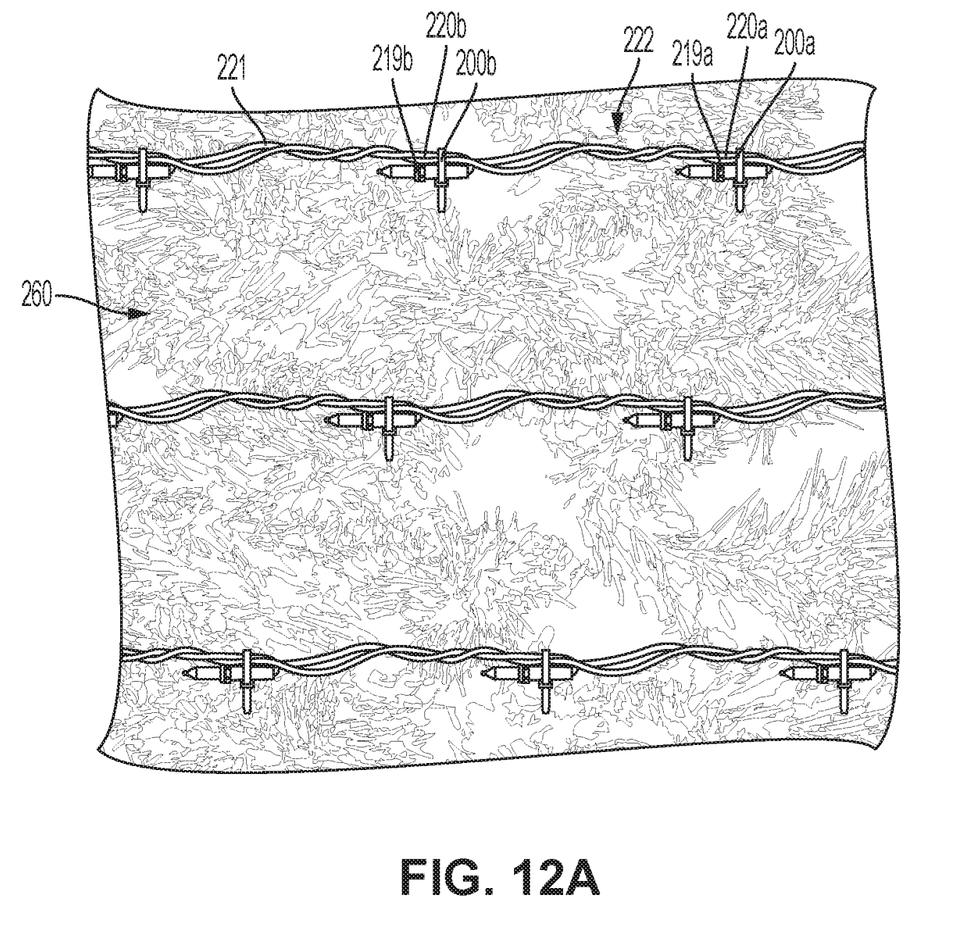
FIG. 12A is a side view illustrating a plurality of assembled inline tie-holders with respective light bulbs decorated on a Christmas tree.
Figure 12B:
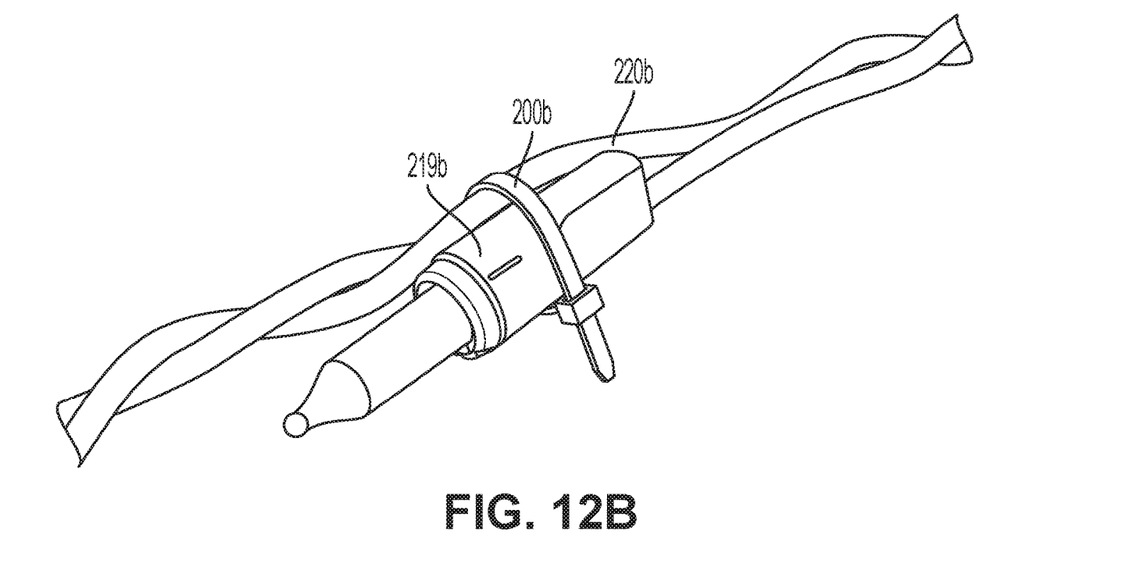
FIG. 12B is an enlarged perspective view illustrating one of the tie-holders of FIG. 12A wrapped around a respective light bulb.

Referring to FIGS. 12A and 12B, in accordance with an alternative embodiment, the inline holder is in the form of inline tie-holders 200a, 200b. The inline tie-holders 200a, 200b wrap around and secure in the desired orientation light bulbs 219a, 219b of a light string 222. Specifically, the light string 222 decorates a Christmas tree 260 in which a plurality of light bulbs of the light string 222 include a first light bulb 219a and a second light bulb 219b. Each of the first and second light bulbs 219a, 219b is oriented inline, via respective ones of the inline tie-holders 200a, 200b, with a common electrical wire 221 of the light string 222. Adjacent wire portions 220a, 220b, of the common electrical wire 221 are also inserted within respective ones of the inline clips 200a, 200b. Thus, in this illustrated embodiment, at least two (if not all) of the light bulbs are oriented in the same direction, e.g., inline with the common electrical wire 221.

Figure 13:
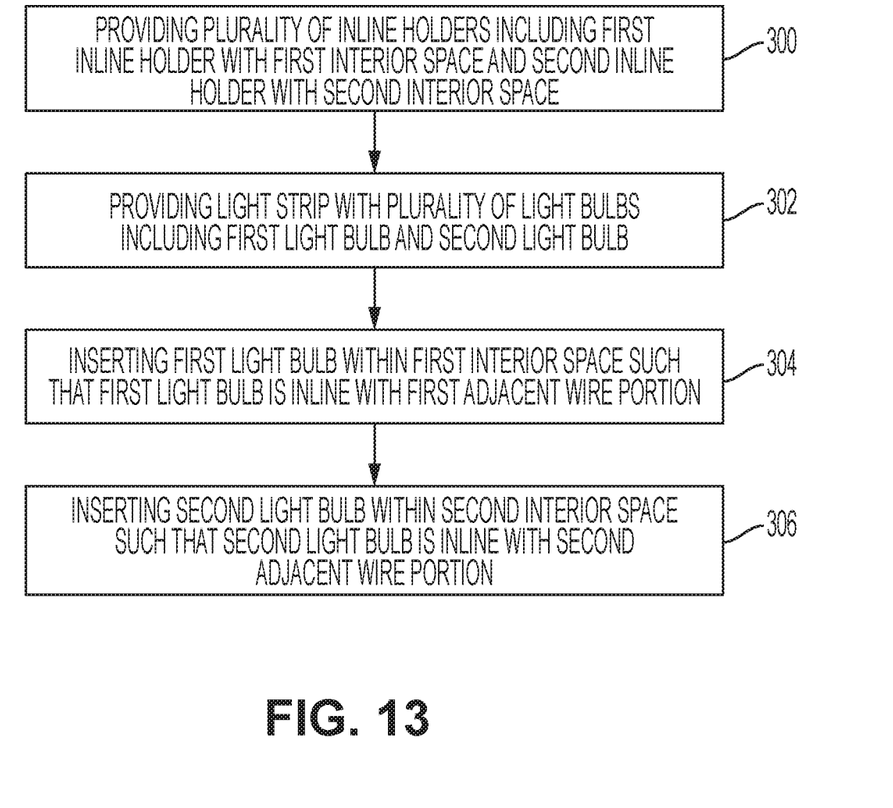
FIG. 13 illustrates a method for holding light bulbs inline along a light string.

Referring to FIG. 13, a method is directed to holding light bulbs inline along a light string and includes at step 300 providing a plurality of inline holders, which include a first inline holder and a second inline holder. The first inline holder has a first interior space and the second inline holder has a second interior space. The method further includes at step 302 providing a light string having a plurality of light bulbs that extend from a common electrical wire. The plurality of light bulbs includes a first light bulb near a first adjacent wire portion of the common electrical wire and a second light bulb near a second adjacent wire portion of the common electrical wire. The method also includes at step 304 inserting the first light bulb within the first interior space of the first inline holder such that the first light bulb is inline with the first adjacent wire portion. The method further includes at step 306 inserting the second light bulb within the second interior space of the second inline holder such that the second light bulb is inline with the second adjacent wire portion.

Each of these embodiments and obvious variations thereof is contemplated as falling within the spirit and scope of the claimed invention, which is set forth in the following claims. Moreover, the present concepts expressly include any and all combinations and sub-combinations of the preceding elements and aspects. The present disclosure is not limited to the specific illustrated example but extends to alternative embodiments other shapes and/or configurations in accordance with the knowledge of one of ordinary skill in the art applied consistent with the presently disclosed principles.

What is claimed is:

1. An inline clip for holding a light bulb along a light string, the inline clip comprising:
   a top area defined by a straight length extending across a front profile, a constant width extending across a side profile, and a constant thickness extending from a top surface of the top area to an internal surface of the top area, the top area having a left end and a right end;
   two symmetrical sides extending in a continuous manner at respective upper ends from the left end and the right end of the top area, each of the two symmetrical sides being defined in part by the same constant thickness of the top area, the two symmetrical sides being arcuate shaped and forming a hollow interior space configured to receive within a light bulb and a portion of the light string aligned side-by-side along their respective diameters, each of the two symmetrical sides having a lower end that is closer to a center point of the interior space than a respective upper end; and
   two symmetrical tabs extending in a continuous manner at respective connecting ends from the lower ends of the two symmetrical sides, the two symmetrical tabs extending in a straight line from the respective lower ends to terminating ends, the terminating ends being farther from the center point of the interior space than the lower ends of the two symmetrical sides but closer to the center point of the interior space than outermost portions of the two symmetrical sides.

2. The inline clip of claim 1, wherein each of the two symmetrical tabs has at least one of (a) a front chamfered edge between a front surface and a bottom surface of the tab and (b) a rear chamfered edge between a rear surface and the bottom surface of the tab.

3. The inline clip of claim 1, wherein the straight length is in the range of 0.29-0.35 inches.

4. The inline clip of claim 1, wherein the constant width is in the range of 0.44-0.54 inches.

5. The inline clip of claim 1, wherein an outermost distance between the outermost portions of the two symmetrical sides is in the range of 0.53-0.65 inches.

6. The inline clip of claim 1, wherein an exterior surface of the lower end of each of the two symmetrical sides is separated from an exterior surface of the upper end by a distance in the range of 0.32-0.39 inches, the distance being measured perpendicularly from the exterior surface of the upper end to the exterior surface of the lower end.

7. The inline clip of claim 1, wherein the two symmetrical tabs are separated internally at the connecting ends by a distance in the range of 0.14-0.18 inches.

8. The inline clip of claim 1, wherein the two symmetrical tabs are separated internally at the terminating ends by a distance in the range of 0.21-0.25 inches.

9. The inline clip of claim 1, wherein the top surface of the top area is separated from the terminating ends of the two symmetrical tabs by a total height distance in the range of 0.46-0.56 inches, the total height distance being measured perpendicularly from the top surface of the top area to an exterior surface of either one of the terminating ends.

10. A method for holding light bulbs inline along a light string, the method comprising:
   providing a plurality of inline holders including a first inline holder and a second inline holder, each of the first inline holder and the second inline holder including:
      a top area defined by a straight length extending across a front profile, a constant width extending across a side profile, and a constant thickness extending from a top surface of the top area to an internal surface of the top area, the top area having a left end and a right end,
      two symmetrical sides extending in a continuous manner at respective upper ends from the left end and the right end of the top area, each of the two symmetrical sides being defined in part by the same constant thickness of the top area, the two symmetrical sides being arcuate shaped and forming a hollow interior space configured to receive within a light bulb and a portion of the light string aligned side-by-side along their respective diameters, each of the two symmetrical sides having a lower end that is closer to a center point of the interior space than a respective upper end, the hollow interior space being a first interior space for the first inline holder, the hollow interior space being a second interior space for the second inline holder, and
      two symmetrical tabs extending in a continuous manner at respective connecting ends from the lower ends of the two symmetrical sides, the two symmetrical tabs extending in a straight line from the respective lower ends to terminating ends, the terminating ends being farther from the center point of the interior space than the lower ends of the two symmetrical sides but closer to the center point of the interior space than outermost portions of the two symmetrical sides;
   providing a light string having a plurality of light bulbs extending from a common electrical wire, the plurality of light bulbs including a first light bulb near a first adjacent wire portion of the common electrical wire, the plurality of light bulbs including a second light bulb near a second adjacent wire portion of the common electrical wire;
   inserting the first light bulb within the first interior space of the first inline holder such that the first light bulb is inline with the first adjacent wire portion; and
   inserting the second light bulb within the second interior space of the second inline holder such that the second light bulb is inline with the second adjacent wire portion.

11. The method of claim 10, wherein inserting the first light bulb within the first interior space causes temporary displacement of the two symmetrical sides of the first inline holder away from each other, the two symmetrical sides of the first inline holder moving back to their original position after the first light bulb is passed the two symmetrical tabs of the first inline holder, the first light bulb having a respective diameter that is located near one side of the first interior space and the first adjacent wire portion having a respective diameter that is located near an opposing side of the first interior space.

12. The method of claim 10, further comprising:
   orienting all remaining ones of the plurality of light bulbs parallel to respective adjacent wire portions of the common electrical wire; and
   inserting each of the remaining ones of the plurality of light bulbs and the respective adjacent wire portions within respective interior spaces of inline holders of the plurality of inline holder, the first light bulb, the second light bulb, and each of the remaining ones of the plurality of light bulbs being oriented inline with the common electrical wire of the light string.

13. The method of claim 10, further comprising positioning the first light bulb and the first adjacent wire portion next to each other such that contact resistance with the first inline holder prevents the inline clip from moving along the common electrical wire of the light string.

14. The method of claim 10, further comprising positioning within the first inline holder only a base portion of the first light bulb, an optical portion of the first light bulb remaining completely free of the first inline holder.

\* \* \* \* \*